United States Patent

[11] 3,566,823

| [72] | Inventor | Charles Davis Hope-Gill |
| | | 1580 Jamaica Square, North Tonawanda, N.Y. 14120 |
| [21] | Appl. No. | 771,119 |
| [22] | Filed | Oct. 28, 1968 |
| [45] | Patented | Mar. 2, 1971 |
| [32] | Priority | Nov. 7, 1967 |
| [33] | | Great Britain |
| [31] | | 50526/67 |

[54] POWER PLANT
14 Claims, 8 Drawing Figs.

[52] U.S. Cl. ................................................. 114/67, 60/230
[51] Int. Cl. ................................................. B63b 1/38
[50] Field of Search........................................... 60/39.58, 264, 230, 231(Inquired)

[56] References Cited
UNITED STATES PATENTS

| 2,635,422 | 4/1953 | Landgraf | 60/39.58X |
| 3,188,805 | 6/1965 | Gahagan | 60/247 |
| 3,396,538 | 8/1968 | Wetherbee | 60/264X |

*Primary Examiner*—Andrew H. Farrell
*Attorney*—Maybee & Legris

ABSTRACT: In a jet power plant, the mass flow and/or momentum of the primary jet is augmented by passing the hot primary jet over a heat exchanger to which a secondary fluid is supplied. The secondary fluid receives heat from the primary jet and is directed as a secondary jet so as to assist the primary jet.

INVENTOR.
CHARLES DAVID HOPE-GILL
BY Maybee & Legris
ATTORNEYS

PATENTED MAR 2 1971

INVENTOR.
CHARLES DAVID HOPE-GILL
BY Maybee & Legris
ATTORNEYS

INVENTOR.
CHARLES DAVID HOPE-GILL
BY Maybee & Legris
ATTORNEYS

POWER PLANT

This invention relates to power plant in which the energy of a jet of high-temperature fluid is utilized to perform mechanical work. The invention is applicable to jet propulsion power plants for fixed wing aircraft, vertical takeoff and landing aircraft, and vehicles such as automobiles and ground effect machines, and also to gas turbine propulsion engines and rockets.

In the case of a jet propulsion engine, much of the thermal energy of the hot gases of the jet is wasted, and it is an object of the present invention to provide means whereby this energy can be utilized to increase the mass flow and/or the momentum of the jet so as to augment the thrust of the jet.

According to the invention, the mass flow and/or the momentum of a jet of high-temperature fluid issuing from a jet nozzle is augmented by passing the high-temperature fluid over a heat exchanger through which a secondary fluid is passed, heat being transferred to the secondary fluid, which is directed as a jet so as to assist the high-temperature fluid jet. The heated secondary fluid may be mixed with the primary fluid.

The secondary fluid may be supplied to the heat exchanger in the form of a gas, such as compressed air, or a liquid, such as water. Alternatively, a suitably fluidized solid may be supplied to the heat exchanger and gasified by the heat transfer.

Since the heat exchanger is disposed in the primary fluid stream it should be aerodynamically shaped in order to minimize loss of momentum of the primary jet by interference. One advantageous application of the invention is to a jet propulsion engine having a jet deflector situated behind the discharge opening of the jet nozzle, since the deflector itself may then be constructed to form the heat exchanger.

In my copending patent application Ser. No. 736,458, now U.S. Pat. No. 3,512,717 there is described a jet deflector for use with jet propulsion power plant, in which the deflector has a surface which presents a convex profile in the longitudinal direction of jet flow and a transverse profile which is concave and matched to the cross-sectional shape of the jet, the surface extending transversely between laterally spaced boundary walls between which the jet is directed when the deflector is in its operative position; the deflector is constructed so that the jet stream tends to follow the curvature of the surface, the surface having a transverse discontinuity of curvature forming a detachment edge for the jetstream. Means are provided for adjustably rotating the deflector member about a transverse axis, and also about a longitudinal axis, to vary the angular deflection of the jet.

My present invention is especially applicable to power plant having such a jet deflector, and according to one aspect of the invention a secondary fluid is introduced into the deflector, possibly in the form of a spray, the secondary fluid being vaporized or expanded by heat transfer from the primary fluid and issuing from openings in the direction of the primary jet to increase the deflection of the primary jet and/or the net thrust of the system.

Several embodiments of the present invention will now be described, by way of example, with reference to the accompanying drawings, in which.

Figure 1:
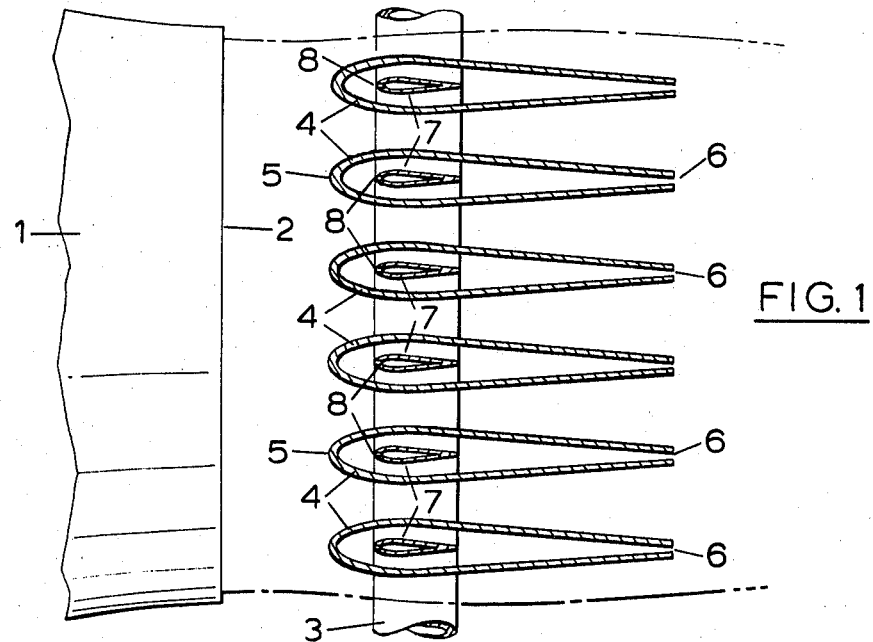
FIG. 1 is a part-sectional elevation of a detail of a jet propulsion engine, to which the invention is applied.

Referring to FIG. 1, the jet nozzle 1 of a jet propulsion engine for an aircraft or other vehicle has a longitudinal axis and a rearwardly directed discharge opening 2, the boundary or envelope of the jet issuing from the nozzle being indicated in ghost lines. Supported behind the discharge opening 2, but to one side of the jetstream, is a pipe 3 to which a secondary fluid is fed from a supply (not shown) carried by the vehicle, one end of the pipe being connected to the supply via a nonreturn valve, and the other end being either closed or also connected to the supply via a nonreturn valve. The supply may be provided by a reservoir and pump, if the secondary fluid is a liquid, or by a compressor if the secondary fluid is air.

An array of heat exchange members 4 is positioned behind the discharge opening 2 so that the jetstream passes over the external surfaces of the members. Each heat exchange member 4 is a hollow body which is rectangular in plan, and of airfoil shape when viewed in longitudinal section, as in FIG. 1. Each heat exchange member has inner and outer heat exchange surfaces. The members 4, which lie in parallel planes along the direction of flow of the jet gases so that the gases flow over the outer surfaces thereof, are supported by the pipe 3. The front edge 5 of each heat exchange member is closed, and the rear edge is provided with an elongated slot 6, or a series of slots, to provide an outlet for secondary fluids. Extending transversely within the widened part of each heat exchange member 4 is a supply pipe 7 which is connected at one end to the pipe 3 and is provided with holes 8 through which the secondary fluid supplied to the supply pipe 7 is sprayed.

In operation of the system, secondary fluid is fed from the supply via the nonreturn valve and the pipes 3 and 7, and is sprayed onto the inner surfaces of the heat exchange members 4, the latter being heated to a high temperature by the main jet. The temperature and pressure of the secondary fluid are therefore greatly increased and the fluid issues from the slots 6 of the heat exchange members, where it mixes with the primary fluid of the main jet to augment the mass flow and/or the momentum of the resultant jet. It may be noted that an overall gain in the useful kinetic energy of the gases can also be obtained if the second fluid's heat of vaporization is sufficiently low and the secondary fluid emerging from the slots 6 is at a higher total pressure and lower temperature than the primary fluid immediately prior to the heat transfer process.

Figure 2:
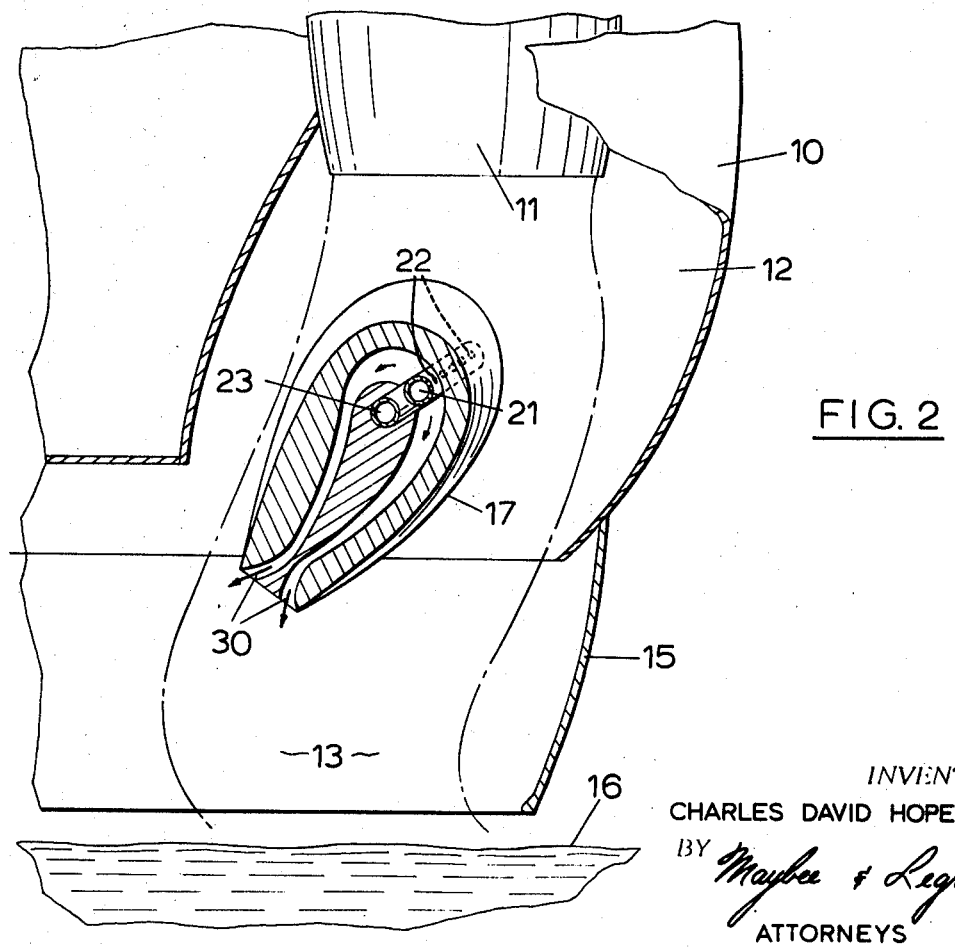
FIGS. 2 and 3 illustrate an application of the invention to a ground effect machine of the hovercraft type, the FIGS. showing diagrammatic, fragmentary, longitudinal and transverse sectional views, respectively, of a detail of the machine.
Figure 3:
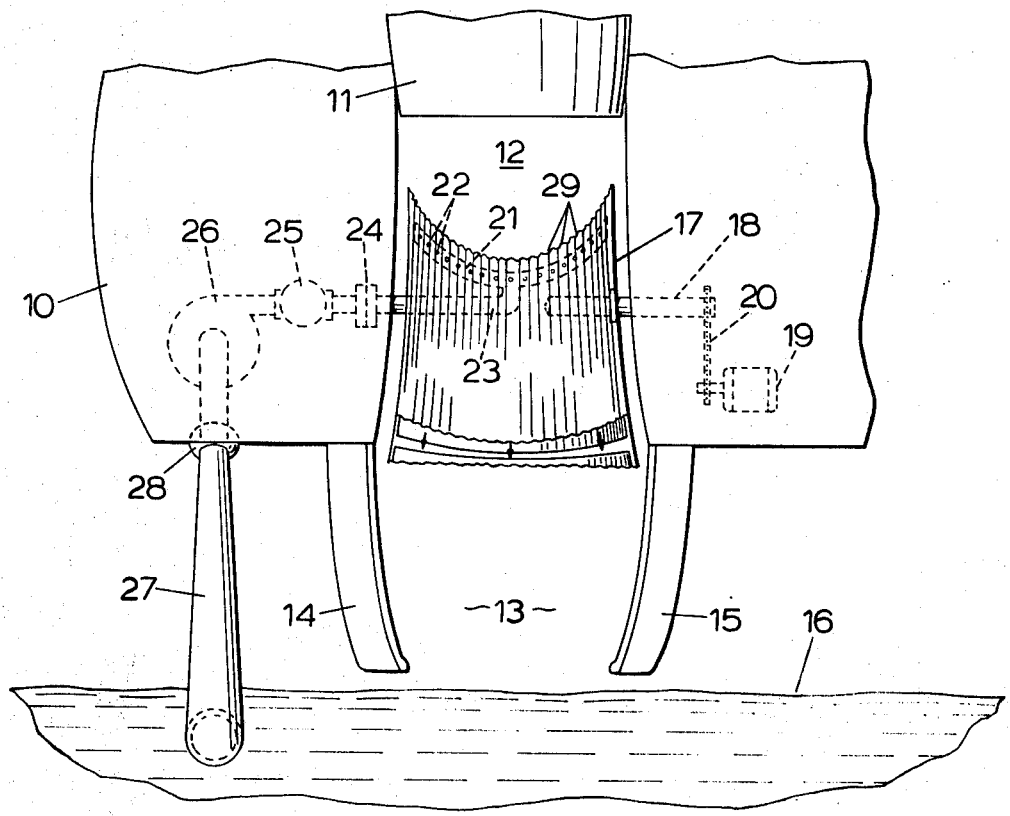

Referring now to FIGS. 2 and 3, a ground effect machine is powered by a system comprising a gas turbine having a jet nozzle 11, which directs a jet along a discharge passage 12 into the space 13 defined by a pair of sidewalls 14, 15 to provide a high-pressure cushion of air or gas. The jetstream is indicated in the drawings by ghost lines. For reasons which will become apparent later, this particular machine is designed for traveling in a water medium, and the water surface across which the machine is conveyed is indicated at 16.

A jet deflector 17 is located in the passage 12 for deflecting the jet from the nozzle 11, and this jet deflector is adjustable about a transverse axis for varying the angle of deflection of the jet. The jet deflector is of the kind described in my copending Pat. application Ser. No. 736,458, having a surface to which the impinging gas stream attaches itself by the Coanda effect. The surface of the deflector 17 presents a convex profile in the longitudinal direction of jet flow and a concave transverse profile which is matched to the cross-sectional shape of the jet, the surface extending between laterally spaced boundary walls, between which the jet is directed so that the jetstream tends to follow the curvature of the surface; the surface has a transverse discontinuity of curvature forming a detachment edge for the jetstream, The jet deflector is mounted on and rotatable with a shaft 18 extending into the passage 12, the shaft 18 being coupled to an electric motor 19 by a chain and sprocket drive 20, and means not shown are provided for energizing the motor to rotate the jet deflector to any desired angular position for deflecting the jet through a chosen angle. A water distributor pipe 21 having a series of spray outlets 22 is located within the jet deflector 17 adjacent to its internal surface. The distributor pipe 21 is connected via a supply pipe 23, a rotatable coupling 24, and a valve 25 to a centrifugal pump 26 which is fed directly from the water environment by a ram scoop 27 extending below the water surface 16. The ram scoop 27 is connected to the vehicle body 10 by a hinge 28, and the ram scoop 27 is biased to the position shown by means of a spring. The surface of the jet deflector is formed with longitudinal corrugations or ribs 29, as best seen in FIG. 3, to increase its surface area for heat transfer.

In operation of the system, water is delivered to the centrifugal pump and sprayed via the distributor pipe 21 and spray outlets 22 onto the internal of the jet deflector 17, the temperature of which is raised to a high value by the hot gases issuing from the jet nozzle 11. The water droplets are rapidly turned to stream which issues from an outlet 30 at the rear edge of the jet deflector in the direction of the deflected jet, and so augments the thrust of the main jet. By mixing with the primary jet flow, the secondary flow increases the ability of the deflector device to turn an increased mass flow through large deflection angles.

Figure 4:
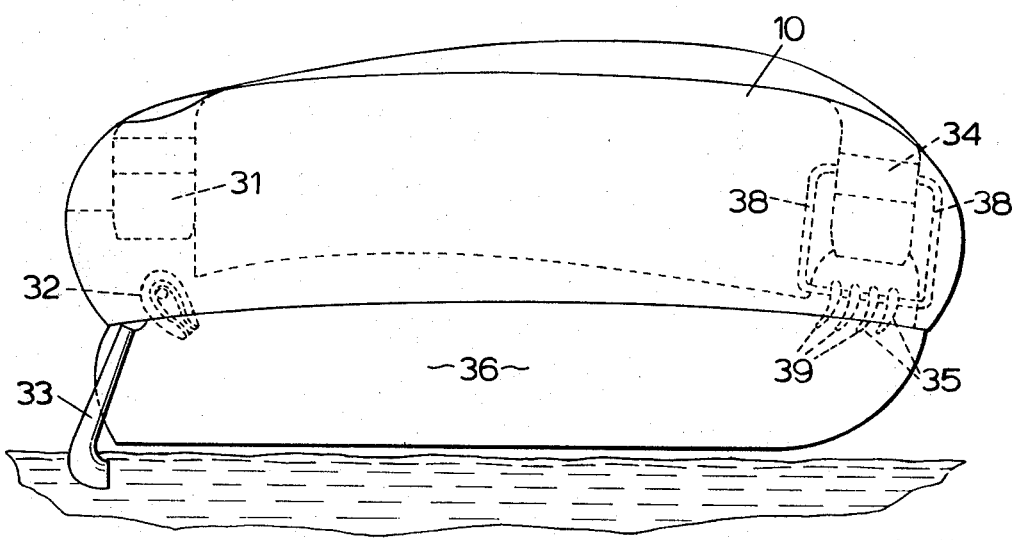
FIG. 4 is a diagrammatic longitudinal sectional view of a ground effect machine of the hovercraft type, the machine incorporating two types of jet deflector embodying different forms of the invention.
Figure 5:
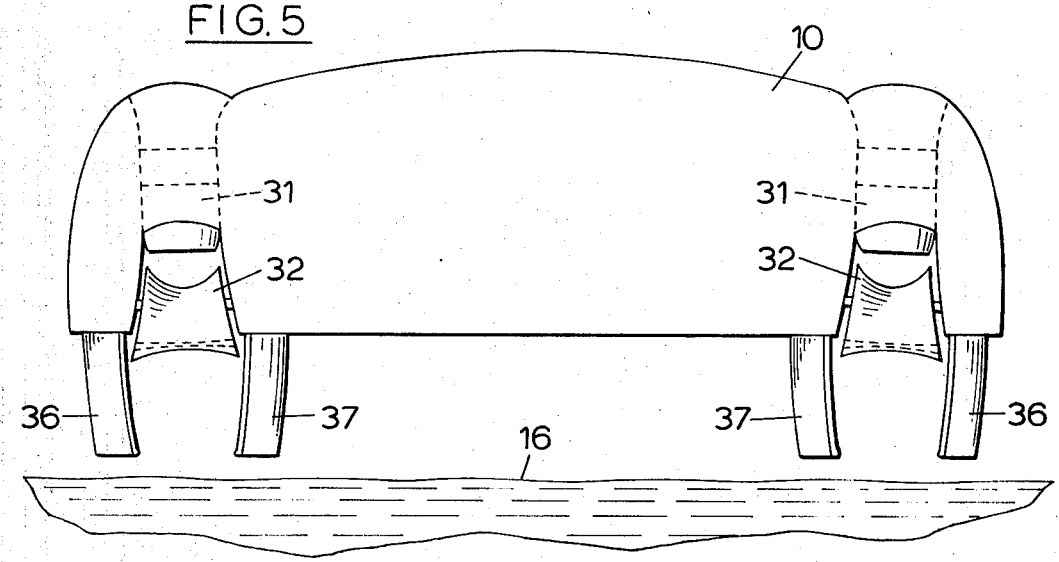
FIG. 5 is a transverse sectional view of the ground effect machine of FIG. 4.

The machine illustrated diagrammatically in FIGS. 4 and 5 is of the type described with reference to FIGS. 2 and 3, but two engine systems are illustrated. The first engine system 31 is identical with that of the embodiment shown in FIGS. 2 and 3, and comprises essentially a gas turbine engine 31, and adjustable jet deflector 32, and a ram scoop 33 for delivering water to a centrifugal pump not shown. As in the preceding embodiment, water is sprayed on to the internal surface of the jet deflector 32, which is heated by the hot gases issuing from the gas turbine 31, and evaporates to provide a steam jet which augments the main jet.

The second engine system, which is included for sake of illustration only, includes a gas turbine engine 34 to provide the main jet, and a series of fixed deflector vanes of airfoil shape 35 for deflecting the gas jet between sidewalls 36, 37 to provide a cushion of gas between the machine and the water surface 16. The vanes 35 are hollow members having slots at their rear edges 39 and means for introducing air bled from the compressor of the gas turbine engine into the interior of the members. The air bled from the compressor is led by passageways 38 to the heat exchange members, or deflector members 35.

IN operation of the vehicle, the first engine system and deflector 32 operate in exactly the same manner as that described with reference to the previous embodiment. In the second engine system the air bled from the compressor (before or after full compression) acts as the secondary fluid and is heated within the deflector members 35 and issues from the openings at the rear edges 39 of the deflector members in the direction of the deflected jet to augment the mass flow and/or the momentum of the main jet.

Figure 6:
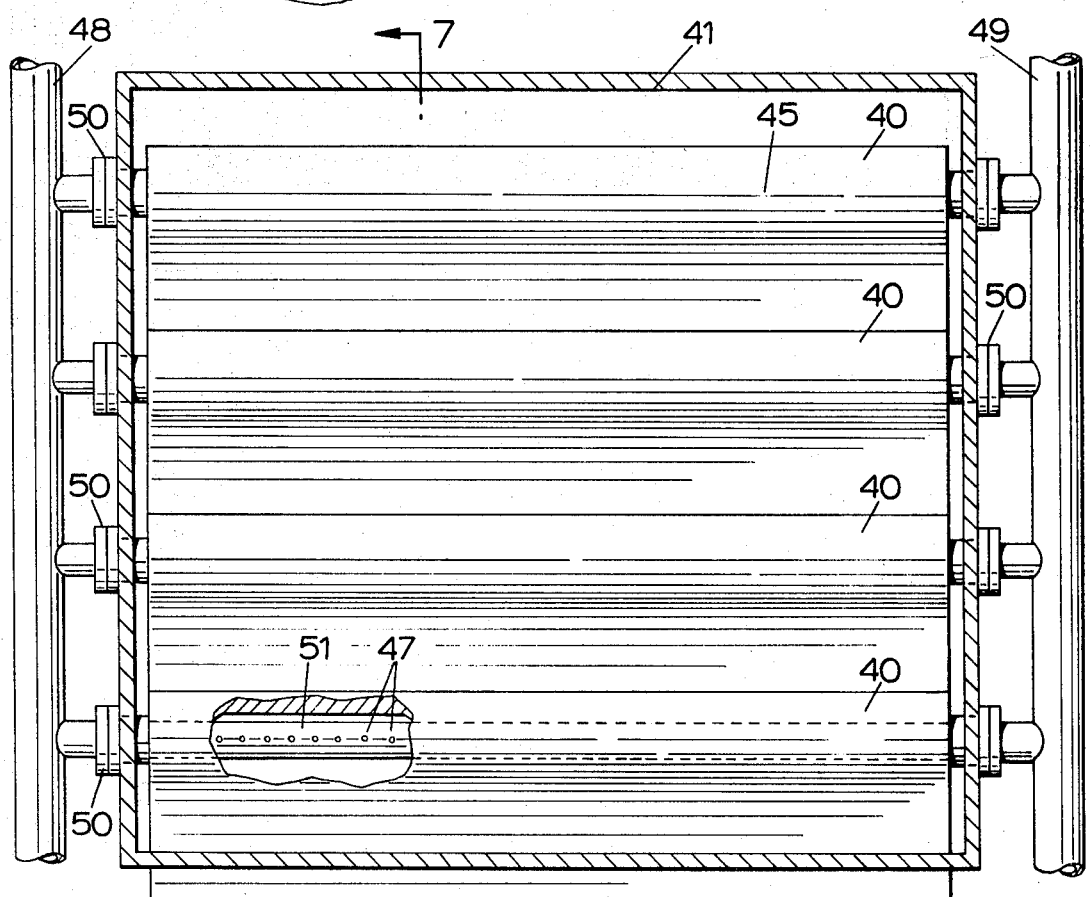
FIG. 6 is an end elevation of another jet deflector to which the invention is applied.
Figure 7:
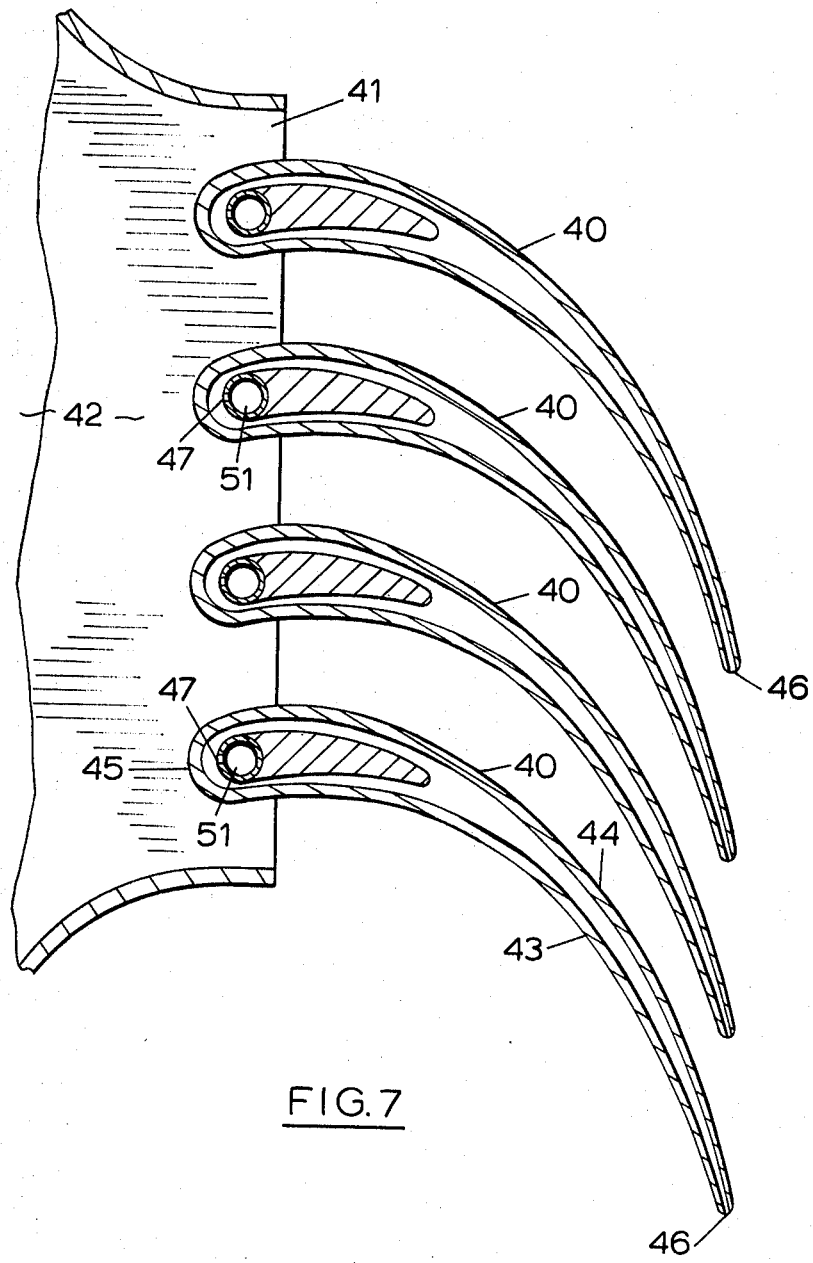
FIG. 7 is a section on line 7-7 of FIG. 6.

FIGS. 6 and 7 illustrate a deflector system of the type incorporated in the second engine system of the previous embodiment. The deflector members 40 of airfoil shape extend across a rectangular opening 41 at the end of a passage 42 along which a jet of hot gases flows. Each deflector member 40 is a hollow body having a concave lower surface 43 and a convex upper surface 44. The front edge of the deflector member 45 is closed and the rear edge 46 is provided with an elongated slot, or a series of slots, to provide an outlet for secondary fluid. Extending transversely within the widened portion of each deflector member 40 is a distributor pipe 51 having outlets 47, and the ends of each distributor pipe 51 are connected to common supply pipes 48, 49 along which compressed air is fed. Rotatable couplings 50 are provided between the pipes 51 and 48, 49.

As in each of the preceding embodiments, the deflector members 40 are heated by the hot jet gases forming the main jet, and secondary fluid, in this case compressed air, is introduced into the interior of the members to be expanded therein by heat transfer. The heated air emerges from the slits 46 to augment the main jet.

Figure 8:
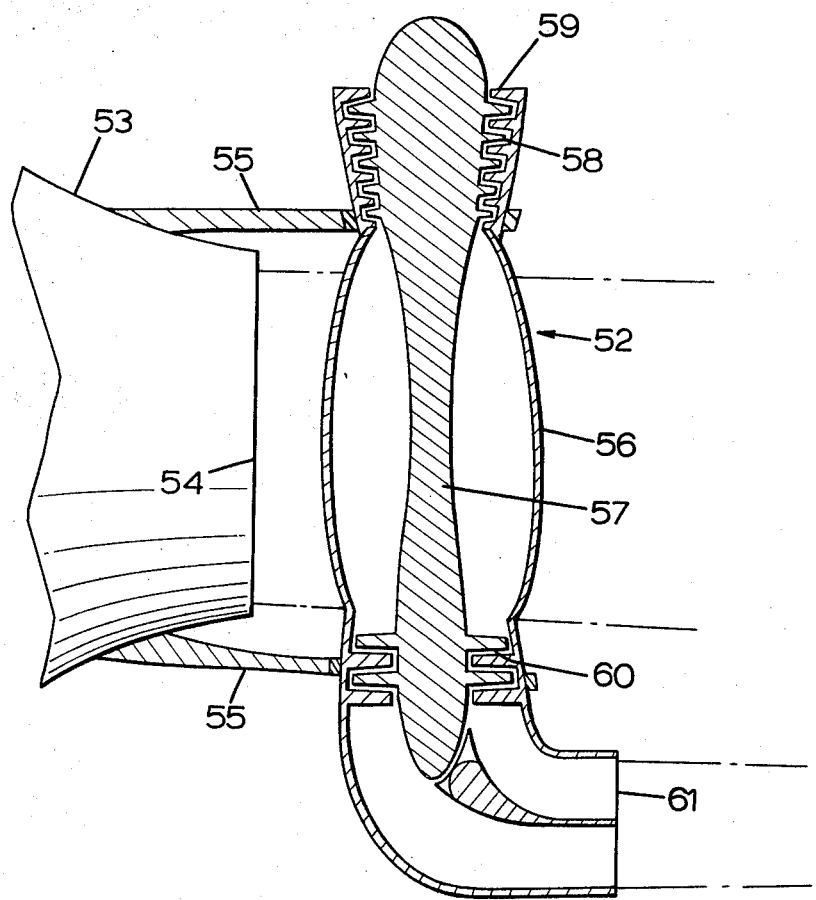
FIG. 8 illustrates a detail of a jet propulsion engine, to which the invention is applied.

In the embodiment shown in FIG. 8, a device 52 for augmenting the thrust of a jet issuing from a jet engine 53, is mounted behind the discharge opening 54 of the jet engine by support struts 55. The device comprises a barrel-shaped hollow body 56 along which extends a rotor shaft 57. The rotor shaft carries the rotor of an air compressor 58, having an air inlet 59, and a turbine 60 whose output is directed through a discharge nozzle 61. The hot gases of the main jetstream pass over the external surface of the body 56, which acts as a heat exchanger. Relatively cool air is drawn into the body 56 via the inlet 59 and is compressed by the air compressor 58. The compressed air is heated within the heat exchanger and drives the turbine, which in turn drives the compressor.

In a modified embodiment not shown in the drawings, a thrust-augmenting device is arranged coaxially with the jet nozzle and is supported therein by support struts. The struts may be twisted so as not to interfere with the main jet. The thrust-augmenting device comprises a torpedo-shaped body having inner and outer heat exchange surfaces, in which a rotor shaft extends axially, the shaft carrying the rotors of an air compressor and a turbine. Cool air is drawn into the torpedo-shaped body or heat exchanger via four radial, airfoil-sectioned inlets, and is heated within the heat exchanger body before and during compression by the compressor. The compressor is driven by the turbine as in the preceding embodiment. The airfoil shape of the inlets creates a swirl of the high-temperature gas flow of the main jet to increase the length of its path over the heat exchanger. The heat exchange process, i.e. the heat transfer from the hotter gas to the cooler gas, may be effected by a cylindrical wire mesh which rotates with the rotor shaft. Seals are used to prevent or reduce leakage of the high-pressure secondary fluid (in this case cooler air) into the high-temperature gas stream. The cylindrical mesh gains heat from the hotter gas and passes through lower temperature chambers of the secondary air, to release its heat to the secondary air. Shaft mechanical work is represented by an extension of the rotor shaft.

It will be appreciated from the foregoing description that the present invention essentially resides in the concept of increasing the overall thermal efficiency of an engine system which relies upon the thrust of a jet of high-temperature fluid, by utilizing the heat of the fluid which would otherwise by wasted so as to add energy to a secondary fluid. In many cases, where the two fluid jets are subsequently mixed, an overall thermodynamic gain may be achieved by causing the jet of secondary fluid to issue at a higher total pressure than the primary jet, where the term "total pressure" means the quantity $$p + \tfrac{1}{2} r V^2$$

where $p$ is the static pressure;
 $r$ is the fluid density; and
 $v$ is the velocity of the fluid.

I claim:

1. In a jetpower plant including a jet nozzle for producing a first jet of high-temperature fluid to perform mechanical work, means for augmenting the thrust of the jet comprising:
   a. an aerodynamically shaped heat exchanger located behind the jet nozzle in the path of the high temperature fluid;
   b. means for passing a secondary fluid through the heat exchanger to receive heat from said high-temperature fluid; and
   c. means for directing the heated secondary fluid as a second jet in a direction to assist the first jet.

2. In a jetpower plant including a jet nozzle for producing a first jet of high-temperature fluid to perform mechanical work, means for augmenting the thrust of the jet comprising:
   a. at least one aerodynamically shaped heat exchanger located behind the jet nozzle in the path of the high-temperature fluid, said heat exchanger comprising a hollow body having inner and outer heat exchange surfaces;
   b. duct means for conducting a secondary fluid to the interior of the heat exchanger;

c. means for spraying the secondary fluid from the duct means onto the inner surface of the hollow body to receive heat from said high-temperature fluid; and d. means combined with the heat exchanger for directing the heated secondary fluid as a second jet in a direction to assist the first jet.

3. In combination with a jet propulsion power plant having a jet nozzle with a discharge opening for forming an axially issuing jet of high-temperature fluid:

a. a jet deflector, said jet deflector comprising a hollow body having inner and outer heat exchange surfaces;

b. means supporting the jet deflector behind the nozzle discharge opening so that said outer surface lies within the normal flow path of the axially issuing jet for deflecting the jet;

c. means for supplying a secondary fluid to the interior of the hollow body to receive heat from said high-temperature fluid; and d. means combined with the jet deflector for directing the heated secondary fluid as a second jet in a direction to assist the deflected jet.

4. In combination with a jet propulsion power plant having a jet nozzle with a discharge opening for forming an axially issuing jet of high-temperature fluid:

a. a jet deflector, said deflector comprising a hollow body having inner and outer heat exchange surfaces;

b. means supporting the jet deflector behind the nozzle discharge opening so that said outer surface lies within the normal flow path of the axially issuing jet for deflecting the jet;

c. means for supplying a secondary fluid to the interior of the hollow body to receive heat from said high-temperature fluid;

d. means combined with the jet deflector for directing the heated secondary fluid as a second jet in a direction to assist the deflected jet; and e. said deflector being rotatable about an axis transverse to the nozzle axis for varying the deflection of said axially issuing jet.

5. In combination with a jet propulsion power plant having a jet nozzle with a discharge opening for forming an axially issuing jet of high-temperature fluid:

a. a jet deflector, said jet deflector comprising a hollow body having inner and outer heat exchange surfaces;

b. means supporting the jet deflector behind the nozzle discharge opening so that said outer surface lies within the normal flow path of the axially issuing jet for deflecting the jet;

c. means for supplying a secondary fluid to the interior of the hollow body to receive heat from said high-temperature fluid;

d. means combined with the jet deflector for directing the heated secondary fluid as a second jet in a direction to assist the deflected jet; and e. said outer heat exchange surface presenting a convex profile in the longitudinal direction of jet flow and a concave transverse profile which is matched to the cross-sectional shape of the jet, the surface extending between laterally spaced boundary walls between which the jet is deflected so that the jetstream tends to follow the curvature of the surface.

6. In a ground effect machine including a jetpower plant having a nozzle for forming a jet of high-temperature fluid, and means defining a space to provide a supporting cushion of the high-temperature fluid:

a. deflector means located behind said nozzle in the path of said jet of high-temperature fluid, the deflector means comprising an aerodynamically shaped hollow body having inner and outer heat exchange surfaces, said outer heat exchange surface being located wholly within the path of the high-temperature jet for deflecting the jet;

b. duct means for conducting a liquid to the interior of the hollow body;

c. means for spraying the liquid from the duct means onto the inner surface of the hollow body to receive heat from the high-temperature fluid and be vaporized thereby; and d. means combined with the hollow body for directing the vaporized liquid as a second jet in a direction to assist the deflected jet.

7. A ground effect machine according to claim 6, in which the deflector means is adjustably rotatable about an axis transverse to the high-temperature jet for varying the deflection thereof.

8. A ground effect machine according to claim 6, the machine being adapted to travel across the surface of water, including a scoop and a pump connected to the duct means for conducting the water into said duct means.

9. In a ground effect machine including a jetpower plant having a nozzle for forming a jet of high-temperature fluid, the machine being adapted to travel across the surface of water:

a. means defining a space to provide a supporting cushion of the high-temperature fluid;

b. jet deflector means comprising an aerodynamically shaped hollow body having inner and outer heat exchange surfaces;

c. rotatable means supporting the deflector means in said space in the path of the jet of the high-temperature fluid;

d. means for rotating the deflector means about an axis transverse to said jet for varying the deflection of the jet;

e. duct means for conducting a liquid to the interior of the hollow body;

f. means for spraying the liquid from the duct means onto the inner surface of the hollow body to receive heat from the high-temperature fluid and be vaporized thereby;

g. means combined with the hollow body for directing the vaporized liquid as a second jet in a direction to assist the deflected jet;

h. a pump having an inlet and an outlet;

i. a scoop extending from the pump inlet for collecting water from beneath said water surface;

j. a valve connected to the pump outlet; and k. a rotatable coupling between the valve and the duct means.

10. In combination with a jet propulsion power plant having a jet nozzle with a discharge opening for forming an axially issuing first jet of high-temperature fluid:

a. a heat exchanger comprising an elongated hollow body having inner and outer heat exchange surfaces;

b. means supporting the heat exchanger behind the nozzle discharge opening so that said outer surface lies within the normal flow path of the axially issuing first jet, said heat exchanger extending transversely to the nozzle axis;

c. said hollow body having an inlet and an outlet at its respective ends;

d. an axial air compressor connected to said air inlet for supplying air to the interior of the hollow body to be heated by the high-temperature fluid;

e. an axial turbine connected to said air outlet;

f. a rotor shaft coupling the air compressor to the turbine; and g. nozzle means connected to the turbine for directing a second jet of said heated air in a direction to assist the first jet.

11. A method of augmenting the mass flow or momentum of a jet of high-temperature fluid issuing from a jet nozzle, which comprises:

a. passing the jet of high-temperature fluid over a heat exchanger located behind the nozzle b. supplying a secondary fluid to the heat exchanger, heat being transferred from the high-temperature fluid to the secondary fluid;

c. forming a jet of said heated secondary fluid; and d. directing the jet of heated secondary fluid so as to assist the first jet.

12. A method according to claim 11, wherein the jet of heated secondary fluid issues at a higher total pressure than said jet of high-temperature fluid.

13. A method according to claim 12, wherein the jet of heated secondary fluid is mixed with the high-temperature fluid jet for increasing the useful kinetic energy of the fluids of the jets.

14. A method of augmenting the mass flow or momentum of a jet of high-temperature fluid issuing from a jet nozzle, the jet being deflected by a deflector device, which method comprises:

a. passing the jet of high-temperature fluid over a heat exchanger located behind the nozzle;

b. supplying a secondary fluid to the heat exchanger, heat being transferred from the high-temperature fluid to the secondary fluid;

c. forming a jet of said heated secondary fluid; and d. directing the jet of heated secondary fluid so as to increase the deflection of the first jet.